United States Patent
Heinz et al.

(10) Patent No.: US 7,875,336 B2
(45) Date of Patent: Jan. 25, 2011

(54) METHOD FOR PRODUCING A COMPONENT, A TOOL FOR CARRYING OUT SAID METHOD AND THE COMPONENT

(75) Inventors: Claus Heinz, Rheinzabern (DE); Bernhard Bauman, Lustadt (DE); Andreas Meyer, Hatzenbuhl (DE); Torsten Köhler, Zeiskam (DE); Sebastien Baumont, Bornel (FR); Godefroy Beau, La Garenne Colombes (FR); Andreas Gehring, Karlsruhe (DE); Freddy Stoof, Hornbourg-Wihr-en-Pleine (FR); Thomas Neuhard, Rumbach (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 371 days.

(21) Appl. No.: 11/909,298

(22) PCT Filed: Mar. 22, 2006

(86) PCT No.: PCT/EP2006/002948

§ 371 (c)(1),
(2), (4) Date: May 29, 2008

(87) PCT Pub. No.: WO2006/100118

PCT Pub. Date: Sep. 28, 2006

(65) Prior Publication Data
US 2008/0309109 A1    Dec. 18, 2008

(30) Foreign Application Priority Data
Mar. 22, 2005  (DE) .................. 10 2005 014 085
Sep. 26, 2005  (FR) .................. 05 09825

(51) Int. Cl.
*B32B 3/00* (2006.01)
*B32B 3/02* (2006.01)
*B32B 3/12* (2006.01)
*B32B 3/26* (2006.01)
*B60J 5/00* (2006.01)
*B60R 13/00* (2006.01)

(52) U.S. Cl. .................. 428/157; 428/31; 428/71; 428/158; 296/1.08; 296/146.7

(58) Field of Classification Search .................. 428/157, 428/158, 31, 71; 296/1.08, 39.1, 146.7; 280/728.3, 280/732, 731; 264/46.5
See application file for complete search history.

(56) References Cited

U.S. PATENT DOCUMENTS
2002/0140122 A1* 10/2002 Kobayashi et al. ......... 264/46.5

FOREIGN PATENT DOCUMENTS
| DE | 20006238   | 5/2001  |
| DE | 10044627   | 3/2002  |
| DE | 20113525   | 9/2002  |
| DE | 10118825   | 10/2002 |
| DE | 10134326   | 1/2003  |
| JP | 04-284209  | 10/1992 |
| JP | 2002-052548 | 2/2002 |

* cited by examiner

*Primary Examiner*—Jennifer C McNeil
*Assistant Examiner*—Catherine Simone
(74) *Attorney, Agent, or Firm*—Fay Kaplun & Marcin, LLP

(57) ABSTRACT

A method for production of a component in a tool having a cavity-forming first and a second tool half comprises the following steps: a) insertion at least of two skins with angled-over end regions into the second tool half such that the angled-over end regions of the skins are situated adjacently with the same orientation and angling; b) rear-foaming or rear-spraying of the skins with a foam material or injection moulding material, c) after insertion of the skins, the end regions of the skins being pressed together in a foam-tight or spray-fight manner at least in regions by pressing at least on one side of the end regions which are situated one above the other against a wall which determines the form and position of the pressed-together end regions.

5 Claims, 5 Drawing Sheets

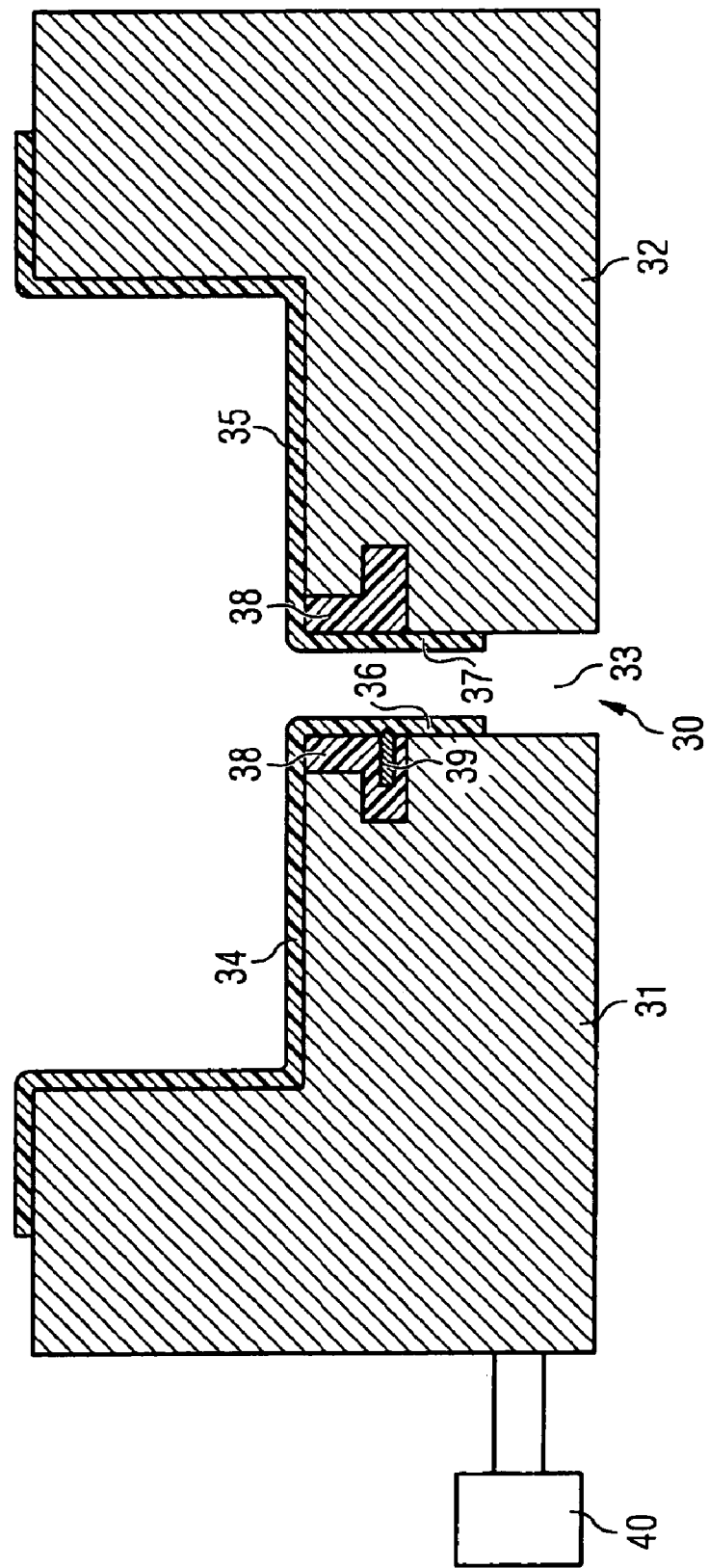

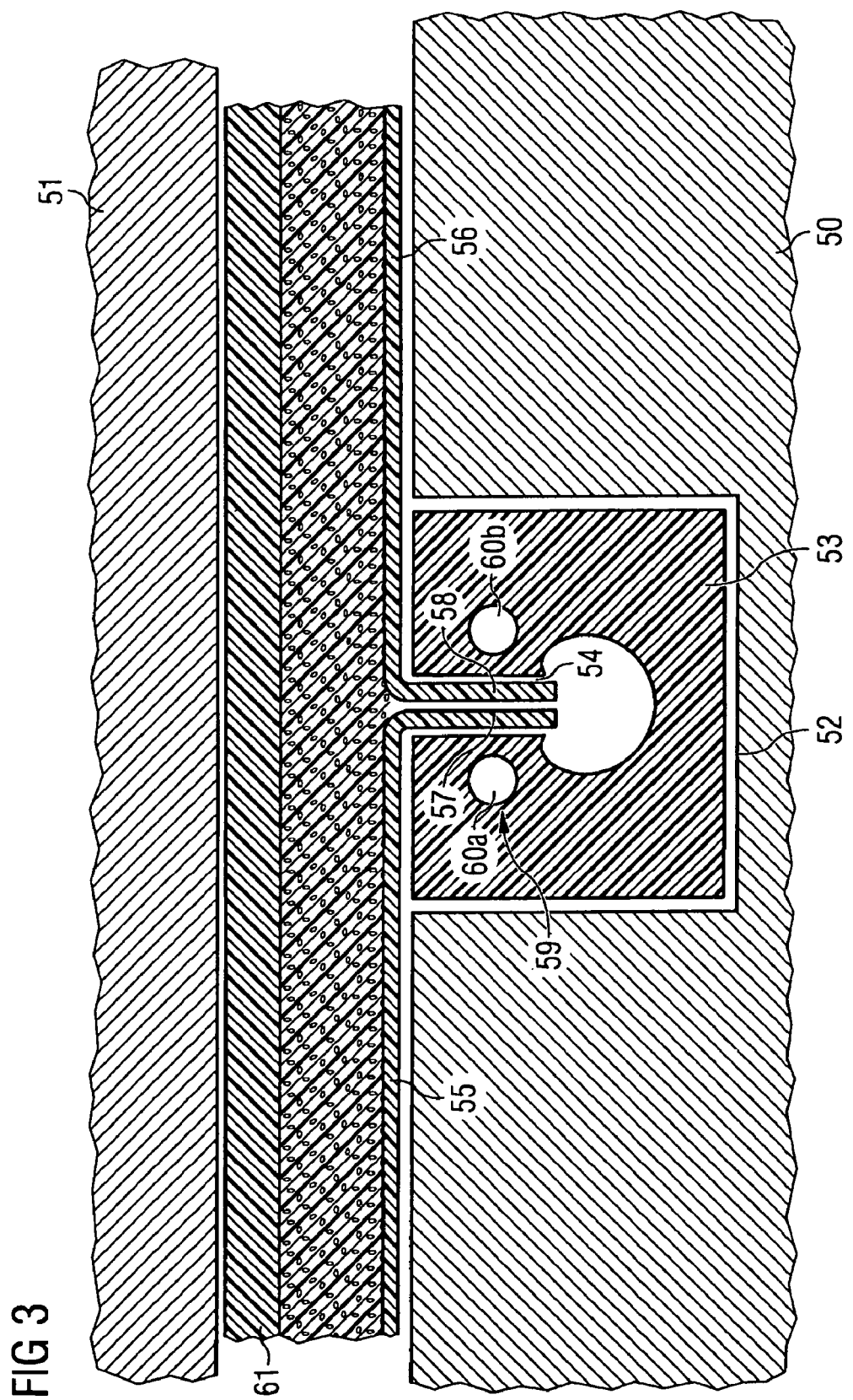

METHOD FOR PRODUCING A COMPONENT, A TOOL FOR CARRYING OUT SAID METHOD AND THE COMPONENT

FIELD OF INVENTION

The invention relates to a method for the production of a component having a multipart cover layer, in particular a decorative layer, to a tool which can be used for application of the method and also to a component which can be produced with the method according to the invention.

BACKGROUND INFORMATION

Interior lining parts having a cover layer which forms a decorative surface are known in the automobile industry. They are used for example as instrument panels, as door linings, as column linings or even as storage compartment covers.

It is the purpose of such components to combine desired mechanical properties with optical and even haptic properties. In order to achieve this, such a component is generally composed of a carrier which determines the mechanical properties, a foam layer which determines the haptic properties and a cover layer which determines essentially the optical properties. Components are also known which dispense with the mentioned additional foam layer, i.e. the skin is connected directly to the carrier.

Furthermore, it is known to assemble cover layers from two or more skins.

However it is problematic in the case of multipart cover layers that, in the common boundary regions of the skins, foam or rear-sprayed material can emerge during rear-foaming or rear-spraying because of unsealed places and hence can reduce the quality of the surface.

A known method for foam-tight connection of skins is firstly to turn over the skins in the joint region and to sew them together in the turned-over region. The seam is then sealed in addition for the foaming process.

A further possibility of connecting skins together in a foam-tight manner is described in the publication DE 100 44 627 A1. According to the invention, two adjacent skins are connected to each other along the seam line thereof via a retaining means. In one embodiment, the retaining means is configured as a profile-like strip which clamps the adjacent skins together along the seam line. The skins connected to each other in a foam-tight manner in this way are inserted into the tool after connection to the retaining means and then are rear-foamed or rear-sprayed.

The disadvantage of these methods is that an additional method step and/or additional connection means must be used in order to connect the skins together.

The published patent specification JP 2002-052548 discloses, in the mentioned prior art, a method for the production of a component having a rear-foamed, multipart cover layer, at least two skins with angled-over end regions being inserted adjacently into a tool half of a foaming tool so that the end regions of the skins protrude into the cavity. The two end regions of the skins lie one on the other in a planar manner. The surface of the one end region is configured with a projection on the side opposite the other end region, which projection engages in a corresponding recess of the other end region. By means of this engagement, a certain sealing is achieved which is intended to prevent foam being able to emerge through a gap forming between the two end regions.

The disadvantage of this method or of this type of seal is, on the one hand, that the skins have a certain rigidity and must be fixed in their position in order to be able to retain their form and position even during the rear-foaming or rear-spraying. As a result of this, the choice of skins, the choice of pressures and the flow processes of the foam material or injection moulding material during rear-foaming and rear-spraying is significantly restricted. Furthermore, adequate sealing of such an arrangement often cannot be achieved since the contact pressure of the two end regions against each other, which is advantageous for the sealing, results solely from the position and the material properties of the skins. Furthermore, also a sufficient length of the contact region of the two end regions is required in order to ensure adequate sealing.

SUMMARY OF INVENTION

The present invention relates to a method for production of a component, in particular a lining, with a rear-sprayed or rear-foamed cover layer comprising at least two skins, which comprises, on the one hand, only a few steps in which in particular a foam- or spray-tight connection of the skins before insertion of the skins into the tool can be dispensed with and which enables adequate sealing of the boundary region of the skins in the case of a virtually arbitrary choice of skins, and hence can be applied in a time- and cost-efficient manner and be versatile. It is a further object of the invention to produce a tool with which such a method can be implemented. It is a further object of the invention to produce a component, in particular a lining, which can be produced in particular with the method according to the invention.

The present invention produces a method for the production of a component in a tool having a cavity-forming first and second tool half, comprising the steps: a) insertion at least of two skins with angled-over end regions into the second tool half such that the angled-over end regions of the skins are situated adjacently with the same orientation of angling; b) rear-foaming or rear-spraying of the skins with a foam material or injection moulding material, c) after insertion of the skins, the end regions of the skins being pressed together in a foam-tight or spray-tight manner at least in regions by pressing at least on one side of the end regions which are situated one above the other against a wall which determines the form and position of the pressed-together end regions.

According to the method according to the invention, the skins, in contrast to DE 100 44 627 A1, can be inserted in particular individually into the tool. As a result of this, the step of connecting the skins in a foam- or spray-tight manner before insertion of the skins into the tool can be dispensed with.

The seal of the decorative surface formed by the skins in the boundary region of the skins is ensured in that they are pressed together in a foam- or spray-tight manner at least in regions by pressing at least on one side of the end regions which are situated one above the other against a wall which determines the form and position of the pressed-together end regions. In contrast to the state of the art cited in the printed patent specification JP 2002-052548, the end regions which are situated one above the other are pressed together (between a wall and a pressure medium). By the specific pressing-together of the end regions, in particular using high pressure, an excellent seal of this region can be produced. Likewise in contrast to the state of the art cited in the printed patent specification JP 2002-052548, a special form of the end regions, apart from the angling, is in addition unnecessary.

The angle of the angling can be chosen arbitrarily, for example at 90°. Preferably the angles of the anglings of both end regions of the skins add up to approx. 180°. This facilitates the adjacent positioning of the skins but is not absolutely necessary.

Furthermore, the skins can also be inserted into the tool without a direct contact. The contact can be produced in a subsequent pressing together of the end regions.

Pressing of the end regions of the skins which are situated one above the other against the wall takes place preferably continuously, i.e. without interruption, along the entire course of the desired foam-tight boundary region of the adjacent skins in order to ensure as good a seal as possible. However, it is basically also possible to exert a contact pressure only in portions.

Almost any planar thin-walled components, in particular the elements used in the automobile industry as typical skins, can be used as skins, for example cast skins, slush skins, for example made of PVC, injection moulded skins, for example made of PUR, multilayer composite films, leather, fabric, knitted materials etc.

Also different types of skins, for example a PVC skin with a PUR skin, can in particular be combined together. This is not normal according to the prior art.

Polyurethane should be mentioned here as typical material for rear-foaming, for rear-spraying, polypropylene.

An advantageous development of this method provides that the end regions of the skins are melted together at least in regions after insertion of the skins into the second tool half.

Basically a durable stable connection of the end regions is no longer necessary because of the effect of the rear-foamed or rear-sprayed material which likewise fixes the skins. Nevertheless, it can however be sensible to connect the end regions of both skins to each other in addition, for example in order to improve the optics. According to the invention, this is achieved by melting the end regions.

There should be understood here by melting also melting, in regions, of at least one of the surfaces of an end region which is in contact with the oppositely-situated end region.

Melting of the end regions can be achieved for example by exerting a sufficiently high pressure when pressing together the end regions, by additional heating of the end regions before insertion into the tool or in the inserted state.

Basically, the possibilities are of course maintained of glueing the end regions subsequently, clamping them or connecting them to each other in another manner.

A further advantageous development of the invention provides that one of the skins, preferably both skins, comprises or comprise a thermoplastic material.

This is sensible in particular when the end regions of the two skins are intended to be melted together. In this case, even already solidified skins can still be connected to each other.

As materials there are suitable for example TPE (thermoplastic elastomers) or TPO (thermoplastic elastomers based on olefins), mixtures of PVC and ABS, ASA (acrylonitrile-styrene-acrylic ester-copolymer) and mixtures of PVC and ASA.

An advantageous first variant of the method provides that the skins are inserted into the second tool half such that the angled-over end regions of the skins are directed away from the cavity of the tool and, during the rear-foaming or the rear-spraying, the end regions of the skins are pressed together at least in regions by means of mutually moveable surface regions of the second tool half situated in the region of the cavity.

The mutually moveable surface regions can be formed for example by rigid elements which are displaceable relative to each other and between which the end regions of the skins can be pressed together. A further example is deformable surface regions which are intended to fall here also within the term "moveable", by deformation of which a pressure can be exerted on the end regions which are situated one above the other and these can hence be pressed together.

In particular as a result of the moveable surface regions, for example by means of the mentioned displaceable rigid and deformable surface regions, a wall which determines the form and position of the pressed-together end regions can be formed. This is however not absolutely necessary.

As a result of the moveable surface regions, it is possible to exert an adequate pressure on the end regions of the skins so that these can be pressed together in a foam-tight or spray-tight manner.

An advantageous development of the first variant provides that the end regions of the skins are edged with a trim.

A further advantageous development of the first variant of the method provides that the end regions of the skins are edged with a strip before insertion of the skins into the tool, or the strip is disposed firstly between the moveable surface regions of the second tool half and subsequently the end regions of the skins are introduced into the strip, or the end regions of the skin are edged with a strip after rear-foaming or rear-spraying.

A strip of this type can be for example a trim in order to cover the protruding end regions of the skins in an optically attractive manner. Furthermore, for example a strip with a U-shaped profile is suitable for edging the end regions.

According to the invention, the trim is preferably inserted into the second tool half in front of the skins. Thereafter, the skins are inserted so that their end regions are edged by the strip. The foam-tight or spray-tight pressing together of the end regions by the moveable surface regions is, in this case, transferred by the walls of the strip to the end regions. Preferably the strip is plastically deformable so that the strip is fixed to the component in the same step.

An advantageous second variant of the method provides that a carrier which has a web is disposed in the first tool half so that the web protrudes into the cavity of the tool, and the skins are inserted into the second tool half such that the skins are situated one above the other at least in regions with their angled-over end regions and the end regions protrude into the cavity of the tool, the web of the carrier and end regions of the skins being disposed such that, during rear-foaming or rear-spraying, the end regions of the skins which are situated one above the other are pressed at least partially against the web of the carrier by means of the foam material or injection moulding material.

The web is necessary in order to position and stabilise the seam line of the skins. It forms a wall which determines the form and position of the end regions. It is particularly advantageous in this respect if the web is disposed perpendicular to the carrier and to the surface of the skins. The web must also have a specific height in order to be able to fulfil the mentioned functions. The region in which the height of the web can be varied is dependent in particular upon the thickness of the intermediate layer, i.e. upon the spacing between carrier and cover layer. Advantageously, a height of the web of at least 5 mm is however advantageous.

During rear-foaming or rear-spraying, the skins are pressed against the carrier or web by the pressure of the foam or of the injection moulding material and hence are sealed so that no foam or injection moulding material emerges into the visual region.

However, partial penetration of the foam or of the injection moulding material between the skins and between skins and web is advantageous for the purpose of fixing and glueing the skins to each other and of skins and web. This can be achieved in that the web outer skin is shorter than the web inner skin, as a result of which partial penetration of the foam or of the injection moulding material into the intermediate regions, decorative film skin and web skin, is facilitated.

An advantageous development of the second variant of the method provides that a strut is disposed in the tool half in which the skins are placed in order to produce a groove in the interface region of two skins.

If a strut is used, then a skin is placed on the one side of the strut, the other skin on the other side of the strut and the end regions of the skins above the strut are guided together, protruding into the cavity, so as to overlap each other. The position of the strut is thereby coordinated to the position of the web of the carrier so that, during rear-foaming or rear-spraying, the overlapping region of the skins is pressed at least partially against the web.

The course of the seam line between the two skins is fixed exactly by the strut.

According to the height and width of the strut, the component has a groove along the seam line after production, said groove corresponding to the dimensions of the strut. Hence an optical effect of the decorative surface is produced by the strut. By changing the dimensions of the strut, this optical effect can be changed.

Furthermore, the invention discloses a tool with which in particular the method according to the invention can be implemented.

The tool according to the invention has a cavity-forming first and second tool half, the second tool half having surface regions which are moveable in the region of the cavity, by means of which end regions which are angled over and directed away from the cavity at least of two skins inserted into the cavity can be pressed together at least in regions.

The term "moveable" encompasses, in this context, in particular also deformability.

By means of the moveable surface regions, a gap can be formed or the gap volume thereof can be changed for receiving and pressing together the end regions at least of two skins.

Changing the gap volume is hereby essential. The means for converting this change can be chosen almost arbitrarily. For example the gap volume can be changed by deformation of deformable lateral walls, the relative movement of dimensionally stable lateral walls, slides, which can move into the gap volume, or expandable elements.

An advantageous development of the tool provides that the second tool half has on the surface of the cavity a gap which is formed by lateral walls which cannot be changed in their form and relative position for receiving angled-over end regions at least of two skins, a clamping device which extends along the gap being disposed at least on one lateral wall, by means of which clamping device the gap volume can be reduced and hence the end regions of the skins received by the gap can be pressed together.

In particular a clamping device is also possible which is disposed on both lateral walls of the gap. According to the invention, only a clamping device on one side is however preferred for reasons of cost. In this case, the mutually moveable surface regions would, on the one hand, be formed by the pressure surface of the clamping device and, on the other hand, by the lateral wall against which the clamping device would press the inserted end regions of the skins.

Preferably the clamping device has a displaceable rigid element, preferably an adjustable slide, or an element which can be changed in its expansion, preferably an elastic hose.

According to the invention, an elastic, inflatable hose which is guided in a groove which is provided in one of the lateral walls of the gap is preferred.

The second tool half preferably has a recess which abuts against the cavity and has an insert inserted in the recess, the one lateral wall of the gap being formed by the insert and the other lateral wall of the gap being formed by the one inner wall of the recess.

An insert of this type facilitates assembly, in particular subsequent assembly, and the maintenance of the clamping device since working space can be produced by removing the insert. Furthermore, changing the insert makes it possible to change the gap width.

A further advantageous development of the tool provides that the second tool half is subdivided into at least mutually displaceable dimensionally stable tool sub-parts, by means of which the moveable surface regions are formed, the tool parts being configured in such a manner that, by moving the tool sub-parts in the region of the cavity, a gap can be formed and can be closed again for receiving and pressing together angled-over end regions at least of two skins.

With a tool of this type, it is possible to press the end regions of inserted skins together at very high pressure.

Preferably, at least one tool sub-part, in the region of the gap, has a seal which extends along the gap and is made of a rubber-like material.

A seal of this type prevents damage to the skins during pressing together. For example hard rubber is suitable as rubber-like material. A seal of this type can be disposed in particular on both sides of the gap.

Preferably, a cutting device which extends along the gap, preferably a punching or pinking blade, is disposed in the region of the gap for separating an excess of end regions of skins received in the gap.

The step of removing the excess subsequently or the step of configuring the end regions to the exact length is therefore dispensed with. Furthermore, it is possible to cut back the excess in this way to a length which is below the length for achieving the required sealing effect.

A further advantageous development of the tool provides that the second tool half has a recess which abuts against the cavity and has an insert inserted into the recess and made of an at least partially deformable and elastic material, by means of which the moveable surface regions are formed, the insert having a gap for receiving angled-over end regions at least of two skins, and also a pressure device by means of which, by exerting pressure on the elastic flexible insert, the insert is deformable at least in the region of the gap so that the gap can be opened and closed by the effect of pressure, in particular angled-over end regions at least of two skins can be received by opening and pressed together by closing.

A tool of this type is economical to produce and simple to maintain. In particular tools already present can be retrofitted without great complexity.

On the one hand, the deformability of the material makes it possible to deform the insert in the region of the gap in order to receive and press together end regions of skins. The elasticity of the insert ensures that the insert maintains a basic shape, in particular is deformed similarly during exertion of pressure by the pressure device during each new opening and closing process.

Furthermore, the deformability of the insert prevents damage to inserted skins. The elasticity ensures the desired position of the end regions.

In a first preferred variant, the pressure device has a cavity within the insert in the region of the gap which extends along the gap, to which cavity an excess pressure or low pressure can be applied.

By applying excess or low pressure, the cavity can be increased or reduced in size. Correspondingly, the gap is deformed. This is exploited for receiving and pressing together the end regions of skins. As a result of the fact that the pressing together of the end regions can be assisted by compressed air, an excellent sealing effect can be achieved in particular.

Such a cavity can be provided for example on the right side, left side or also on both sides of the gap. Likewise, a cavity is possible which is disposed underneath the gap. Furthermore, filling of the cavities for exerting a pressure with a gas, for example air, or with a fluid, for example oil, can be effected.

A second variant provides that the insert is fixed in the recess on both sides of the gap and the pressure device is disposed between insert and base of the recess underneath the gap, the pressure device being configured such that a pressure can be exerted on the insert in the gap direction so that, by exerting pressure on the insert, the gap can be bent up for receiving angled-over end regions and can be closed for pressing together the end regions at least of two skins.

In contrast to the first variant, the pressure device is disposed outwith the insert. This makes it possible to configure the insert as a compact, solid element, in particular without cavities as described above.

As a result of the fact that the pressure device is situated outwith the insert, the pressure device can be adapted flexibly to the required conditions.

Preferably, the pressure device has a displaceable rigid element, preferably an adjustable slide, or an element which can be changed in its expansion, preferably an elastic hose.

Preferably, the insert is fixed in the recess at least via its edge region in a form-fit.

This enables simple and durable fixing of the insert in the recess. Other attachment means are of course likewise possible.

Preferably the insert is in one piece in both mentioned variants.

There is suitable as material for example silicone. Silicone is preferred according to the invention since skins made of this material do not remain adhering. Furthermore, silicone inserts of this type can be produced easily.

Basically, also other elastic materials, for example EPDM, can however be used for at least one region of the insert.

Furthermore, the invention discloses a component which can be produced in particular according to the method according to the invention.

According to the invention, the component contains a multipart cover layer, a carrier, at least two skins which form the cover layer and have angled-over end regions and a foam layer situated between the carrier and the skins, the carrier having a web which protrudes into the foam layer and against which the end regions of the skins which are situated one above the other abut in a planar manner on one side.

According to the invention, the seam line of the skins is determined by the course of the web. The web itself is a component of the carrier. This makes further components for positioning the seam line superfluous. The web ensures the position of the skins in the boundary region.

Preferably, the skins are connected to each other, particularly preferred also to the web, in a frictional fit or integrally.

There should be included jointly by the term "frictional fit" here, also melting of two adjacent materials in this context.

As a result of the frictional-fitting or integral connection of the end regions of the skins, the skins are fixed to each other on the web. Additional connection means, such as for example seams, clamping strips or adhesives, are unnecessary.

An advantageous development of the invention provides that the web is perpendicular to the base of the carrier.

This development is advantageous in particular when carrier and skins extend in parallel planes in the region in which the web extends. In this case, the web is not only perpendicular to the carrier but also is orientated perpendicular to the surface of the skins. As a result, the desired course of the seam line of the skins is achieved.

An advantageous development of the invention provides that the component has a groove in the interface region of two adjacent skins.

A further advantageous development of the invention provides that the carrier is a thermoplastic material.

Possible thermoplastic materials are for example PP (polypropylene), ABS (acrylonitrile-butadiene-styrene copolymer), SMA (styrene-maleic acid copolymer) and the blend ABS/PC (PC=polycarbonate).

A further advantageous development of the invention provides that at least one of the skins is a thermoplastic material.

The theromoplasticity at least of one of the skins makes it possible for the end regions of the skins to be connected to each other during the production process of the component by melting/melting on.

Suitable materials for skins have already been mentioned further back.

A further advantageous development of the invention provides that the foam layer comprises polyurethane.

BRIEF DESCRIPTION OF DRAWINGS

The invention is now explained with reference to several embodiments which are represented at least partially by Figures. There are thereby shown:

FIG. 2 a section of a second embodiment of a tool according to the invention and also the state of a second embodiment of the method according to the invention after inserting the skins;

FIG. 3 a third embodiment of a tool according to the invention and also the state of a third embodiment of a method according to the invention after conclusion of the foaming process;

DETAILED DESCRIPTION

Figure 1:
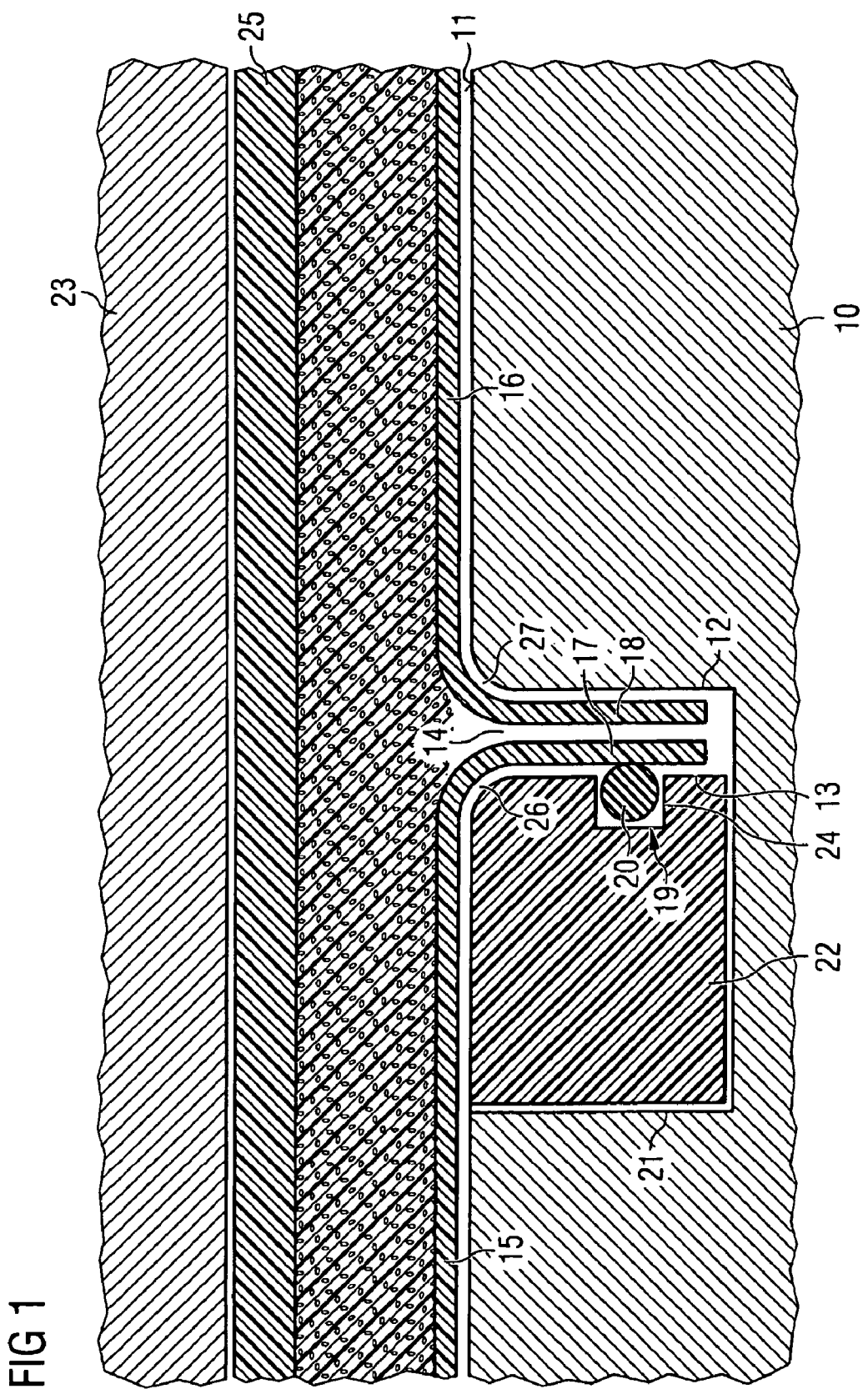
FIG. 1 a first embodiment of a tool according to the invention and also the state of a first embodiment of the method according to the invention after conclusion of the foaming process.

FIG. 1 shows a first embodiment of a tool according to the invention, here a foaming tool, and also a first embodiment of a method according to the invention in the state after conclusion of the rear-foaming process.

The foaming tool according to the invention has a first tool half 23 and a second tool half 10 which together form a cavity.

The second tool half 10 has a gap 14, which is formed by lateral walls 12, 13 which are unchangeable in their form and relative position, on the surface 11 of the cavity 11 for receiving angled-over end regions 17, 18 at least of two skins 15, 16.

On one lateral wall 13, a clamping device 19 which extends along the gap 14 is disposed, by means of which the gap volume can be reduced and hence the end regions 17, 18 of the skins 15, 16 which are received by the gap 14 can be pressed together.

The clamping device 19 in this embodiment contains an inflatable, elastic hose 20 which is disposed in a groove 24 which is provided for receiving the hose 20 and introduced in the lateral wall 13. As an alternative, also a displaceable rigid element, for example an adjustable slide, would be able to be used.

The oppositely-situated other lateral wall 12 is formed by an inner wall of a recess 21 provided in the second tool half 10. This recess extends along the provided separating line of the two skins 15 and 16 and, in this embodiment, has an approximately rectangular profile.

A dimensionally stable insert 22 which is likewise approximately rectangular in profile is inserted into the recess 21. The insert 22 abuts by one side in a planar manner against an inner wall of the recess 21 and also in a planar manner on the base of the recess 21 and terminates flush with the edge of the recess 21.

The insert 22 is narrower in the width of its profile than the width of the recess 21 so that the gap 14 is formed between the one inner wall of the recess 12 and the oppositely-situated lateral wall 13 of the insert 22.

The groove 24 with the hose 20 disposed in the groove 24 is provided in this embodiment in the lateral wall 13 of the insert 22.

The inflatable seal 20 and the oppositely-situated lateral wall 12 of the recess 21 form mutually moveable surface regions of the second tool half. By means of these moveable surface regions, the end regions 17, 18, which are directed away from the cavity, at least of two skins 15, 16 which are inserted in the cavity, can be pressed together in regions.

According to a first embodiment of the method according to the invention, firstly two skins 15, 16 with angled-over end regions 17, 18 are inserted into the second tool half 10 such that the angled-over end regions 17, 18 of the skins 15, 16 come to be situated adjacently in the gap 14 with the same orientation of angling. The angled-over end regions are hence directed away from the cavity. A carrier 25 is inserted in the first tool half. Thereafter, a foam material is introduced into the cavity, the foaming tool is closed and the foaming process is started.

Before starting the foaming process the end regions 17, 18 of the skin are pressed, in the region in which they are situated one above the other, against the lateral wall 12 of the recess 21 by inflating the elastic hose 20 and hence are pressed together in a foam-tight manner. The form and position of the pressed-together end regions are hence established essentially by the lateral wall 12. In this way, an exact course of the separating line of the two skins 15 and 16 is possible.

In this embodiment, the edges 26, 27 of the gap 14 against which the skins 15, 16 abut in the region of their angling, are slightly rounded. Hence damage to the skins 15, 16 in their boundary region is prevented.

In this embodiment, the skins 15 and 16 comprise a thermoplastic material but have different colours. By pre-heating the skins 15 and 16 and also as a result of an increased temperature of the foaming tool, the end regions 17 and 18 are melted easily together under the pressure of the inflated elastic hose 20.

After conclusion of the foaming process, the hose 20 is deflated, the tool is opened and the component with a two-colour decorative surface is removed.

FIG. 2 shows a section of a second embodiment of a tool according to the invention and also a second embodiment of the method according to the invention in the state after insertion of two skins 34, 35 into the second tool half 30 of the tool.

The tool according to the invention, here a foaming tool, has a cavity-forming first tool half (not shown) and second tool half 30.

The second tool half 30 is subdivided into two dimensionally stable tool sub-parts 31, 32 which are mutually displaceable in a translational manner. In this embodiment, the tool sub-part 32 is fixed and the tool sub-part 31 is mounted displaceably by means of a hydraulic cylinder 40. Tool sub-part 31 and 32 form the entire surface of the cavity of the second tool half. It is hence prevented that, apart from a gap 33 between the two tool sub-parts 31 and 32, further unnecessary gaps are produced on the surface of the cavity. The tool sub-parts 31 and 32 represent mutually moveable surface regions by means of which the gap 33 mentioned already above can be formed and closed again for receiving and pressing together angled-over end regions 36, 37 at least of two skins 34, 35.

Both tool sub-parts 31 and 32 in the region of the gap have a seal which extends along the gap and is made of a rubber-like material. The sealing surface is approx. 5-8 mm. Hence damage to the inserted skins 34, 35 during closure of the gap 33 is prevented and a more uniform pressure distribution is achieved.

Furthermore, in the region of the gap 33 in the one tool sub-part 31, there is a cutting device which extends along the gap 33, in this case a punching or pinking blade 39, for separating an excess of end regions 36, 37 of skins 34, 35 received in the gap. On the oppositely-situated tool part 32, a hard rubber device or alternatively a milled groove is provided, into which the blade runs during the closing process of the tool sub-parts 31, 32.

As an alternative to a hydraulic cylinder, also a bent lever for example can be used.

According to a second embodiment of the method according to the invention, two skins 34, 35 with angled-over end regions 36, 37 are inserted into the second tool half in respectively one of the tool parts 31 and 32 so that the angled-over end regions 36 and 37 are situated adjacently in the gap 33 with the same orientation of angling, said gap being formed when the tool sub-parts 31 and 32 are pushed apart. After insertion of the skins 34, 35, the gap 33 is closed by displacing the moveable tool sub-parts 31. In the course thereof, the two end regions 36 and 37 become congruent and are pressed together in a foam-tight manner. The form and position of the lateral walls forming the gap 33 of the tool sub-parts 31 and 32 thereby determine the form and position of the pressed-together end regions.

After the end regions 36 and 37 have been pressed together in a foam-tight manner, the method can be continued analogously to the method in the first embodiment. In this embodiment, the one skin 34 comprises polyurethane, the other skin 35 TPO.

FIG. 3 shows a third embodiment of a tool according to the invention and also a third embodiment of a method according to the invention in the state after conclusion of the rear-foaming.

The tool, here again a foaming tool, has a cavity-forming first tool half 51 and second tool half 50. Furthermore, the second tool half 50 has a recess 52 which abuts against the cavity and has an insert 53 inserted in the recess and made of a deformable and elastic material. In its centre, the insert has a gap 54 for receiving angled-over end regions 57, 58 at least of two skins 55, 56.

Furthermore, cavities which extend along the gap within the insert 53 on the right and on the left side of the gap are provided, said cavities being part of a pressure device 59 and to which an excess pressure or low pressure can be applied. The cavities are configured and disposed in such a manner that the elastically deformable insert in the region of the gap 44 is deformable by means of a pressure change in the cavities in such a manner that the gap can be opened by applying a low pressure and can be closed by applying an excess pressure, in particular angled-over end regions 57, 58 at least of two skins, 55, 56 can be received by applying a low pressure and opening the gap and can be pressed together by applying an excess pressure. In order to facilitate this, the essentially rectangular gap 54 in its profile discharges into an essentially round hollowed portion in its profile. As a result of this hollowed portion, it is ensured that the lateral walls of the gap 54 are deformed usefully by applying different pressures in the cavities 60a and 60b for opening and closing the gap 54.

In this embodiment, the recess 52 has a rectangular profile and extends along the provided separating line of both skins 55 and 56. The insert 53 likewise has a rectangular profile which corresponds to the profile of the recess 52. Hence the insert 53 is situated flush in the recess 52.

The insert 53 in this embodiment is in one piece and comprises silicone.

According to a third embodiment of a method according to the invention, firstly two skins 55, 56 with angled-over end regions 57, 58 are inserted into the second tool half 50 such that the angled-over end regions 57, 58 of the skins 55, 56 come to be situated with the same orientation of angling adjacently in the opened gap 54 of the insert 53. In order to open the gap 54, an adequate low pressure is thereby applied in the cavities 60a and 60b.

After insertion of the end regions 57, 58 of the skins 55, 56 into the gap 54, an excess pressure is applied to the cavities 60a and 60b. By means of the excess pressure in the cavities, the lateral walls of the gap 54 move towards each other and hence press together the end regions 57, 58 which are situated one above the other in the gap in a foam-tight manner. The lateral walls of the gap 54 thereby determine the form and position of the pressed-together end regions 57 and 58.

After disposing a carrier 61 in the first tool half 51, a foam material is introduced into the cavity, the tool is closed and the foaming process is begun.

The end of the foaming process is represented in FIG. 3.

Thereafter, the gap 54 is opened by applying a low pressure to the cavities 60a and 60b, the tool is opened and the finished component is removed.

Figure 4A:
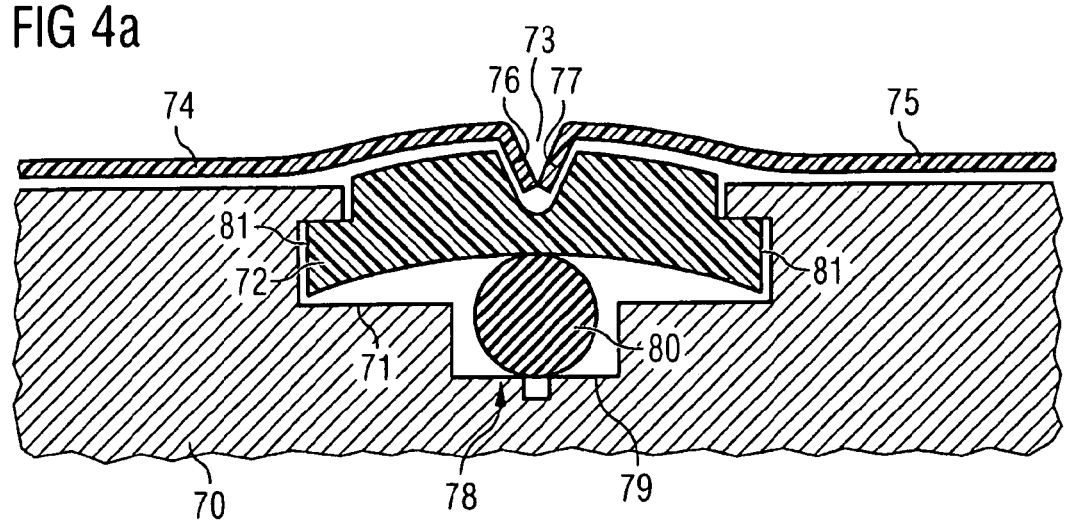
FIG. 4 a fourth embodiment of a tool according to the invention and also a fourth embodiment of the method according to the invention in the state after insertion of the skins into the tool (FIG. 4a) and after pressing together of the end regions of two inserted skins (FIG. 4b)
Figure 4B:
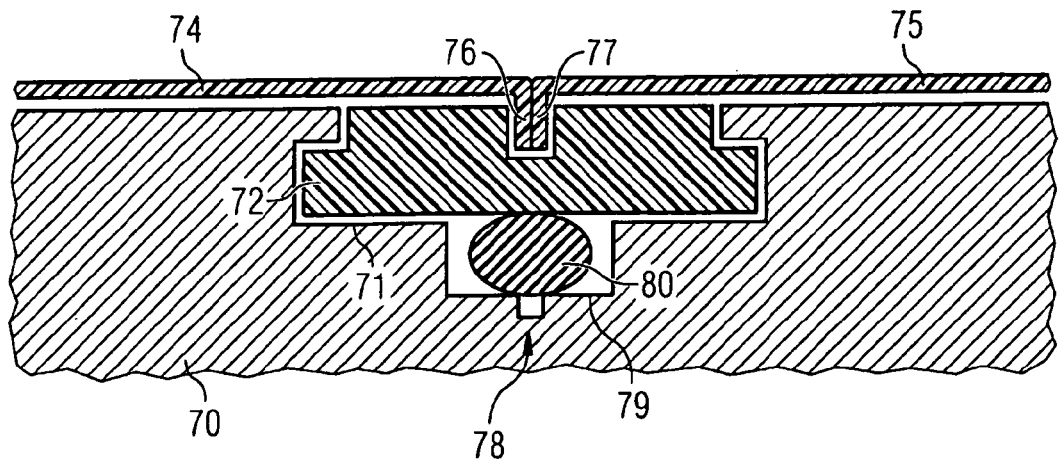

FIG. 4 shows a fourth embodiment of a tool according to the invention and also a fourth embodiment of a method according to the invention, firstly in the state after two skins 74 and 75 have been inserted into the opened gap of the second tool half (FIG. 4a) and in the state in which the end regions 76, 77 of the skins 74, 75 are pressed together in a foam-tight manner (FIG. 4b).

The tool according to the invention has a cavity-forming first tool half (not shown) and second tool half 70. The second tool half has a cavity-limiting recess 71 with an insert 72 which is inserted into the recess and comprises a deformable and elastic material.

In the centre, the insert 72 has a gap 73 for receiving angled-over end regions 76, 77 at least of two skins 74, 75.

Furthermore, a pressure device 78 which, in this embodiment, comprises an inflatable elastic hose, is disposed between insert 72 and base 79 of the recess below the gap.

The recess 71 has an essentially rectangular profile and extends along the provided separating line of the skins 74 and 75. In the centre of the recess, a groove in which the elastic hose 80 is disposed is provided. The oppositely-situated insides of the recess 71 have an undercut in which the insert 72 can be received in a form-fit.

The insert 22 corresponds in its profile to the profile of the recess 71, omitting the groove, in which the elastic hose 80 is disposed. It terminates in particular flush with the edge of the recess 71. Furthermore, the insert 72 is fixed by the form-fit on both sides of the gap 73 in the recess 71.

Without excess pressure in the hose 80, the gap 73 of the insert 72 is closed. By inflating the hose 80, a pressure is exerted on the underside of the insert which bends the gap 73 as a result of the recess 71 being fixed on both sides. As a result, the gap 73 can be bent up so far that the end regions 76, 77 of two skins 74, 75 can be inserted in the gap 73 (see FIG. 4a).

If the pressure in the hose 80 is now reduced, then the insert 72 is transferred into its basic state because of its elasticity, i.e. the gap 73 closes and, in this way, presses together the end regions 76, 77 of the skins 74, 75 which are disposed in the gap (see FIG. 4b).

The insert 72 in this embodiment is in one piece, solid and comprises silicone.

Instead of the elastic hose, also a different pressure device can be used, for example a displaceable rigid element, preferably an adjustable slide.

The fourth embodiment of a method according to the invention provides, when the gap 73 is opened, at least two skins, 74, 75 with angled-over end regions 76, 77 being inserted into the second tool half such that the angled-over end regions 76, 77 of the skins 74, 75 are situated adjacently in the opened gap 73 with the same orientation of angling.

Thereafter, the gap 73 is closed as described above, as a result of which the end regions 76, 77 which are situated one above the other are pressed together in a foam-tight manner. The lateral walls of the gap 73 on the one hand exert the required contact pressure on the end regions 76, 77, on the other hand they determine the form and position thereof.

After closing the gap 73, the method can be continued analogously to the above-described embodiments.

In the described embodiments, exclusively foaming tools and foaming processes were mentioned. The configuration of the tools and the methods can be transferred however analogously to injection moulding tools and rear-spraying processes.

Furthermore, the end regions of the skins can be edged with a strip before insertion into the tool or the strip can be disposed firstly between the moveable surface regions of the second tool halves and, subsequently, the end regions of the skins are introduced into the strip, or the end regions of the skins are edged with a strip after rear-foaming or rear-spraying. Apart from the last-mentioned case, the gap size and the contact pressures must then however possibly be adapted as a result of this additional element.

As advantages of the method according to the invention and tools associated therewith there should be mentioned, on the one hand, the production of components with surfaces which are highly attractive and low-priced, the possibility of foam- and retainer-free trim joints, the combination of a large number of different skins, for example comprising two different or the same materials, for example comprising differently coloured materials, a low rejection level of deep-drawn films in the case of large components and the lack of an additional process for joining the skin.

Figure 5:
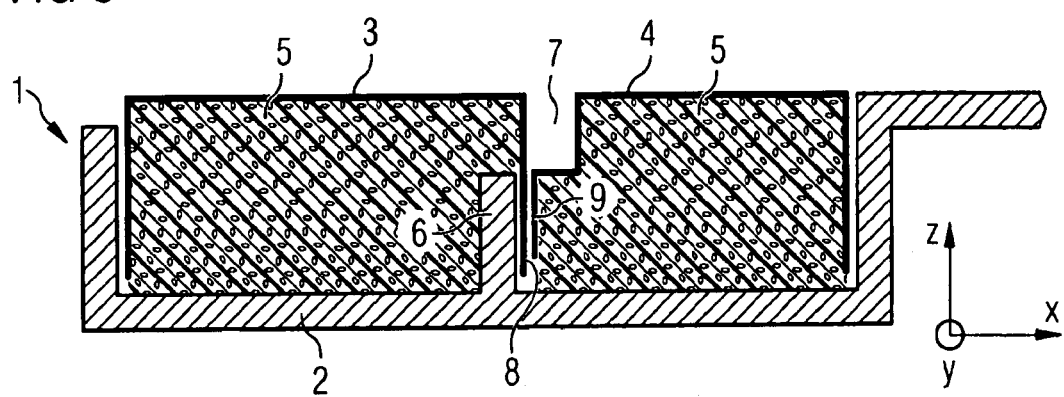
FIG. 5 a component according to the invention produced with a two-part cover layer according to the method according to the invention.

FIG. 5 shows a component 1 according to the invention with a decorative surface, here an interior lining part of an automobile. The component 1 contains a carrier 2, two skins 3 and 4 which form the decorative surface and a foam layer 5 situated between the carrier 2 and skins 3, 4. Furthermore, the carrier 2 has a web 6 which is perpendicular to the base surface of the carrier and protrudes into the foam layer 5.

The skins 3 and 4 are disposed in a common plane adjacently situated on the foam layer 5. In their common interface region/boundary region, the end region 8 of the skin 3 is angled-over in the direction of the carrier so that the end region 8 of the skin 3 is situated perpendicular to the carrier. The end region 9 of the skin 4 is angled-over in the direction of the carrier in the form of a step. After the step, the end regions of the skins 3 and 4 overlap. Hence a groove 7 is formed by the end regions of the skins 3 and 4.

The overlap of the end regions of both skins 3 and 4 protrudes perpendicularly into the foam layer 5. The one side of the overlap which is formed by the end region of the skin 3 thereby abuts against the web 6 of the carrier 2, the other side of the overlap which is formed by the end region of the skin 4 abuts against the foam layer 5.

The height of the web 6 is hereby chosen such that the base of the groove 7 and upper edge of the web 6 are situated in a common plane.

The end region of the skin 3 goes more deeply into the foam layer 5 than the end region of the skin 4. Hence also a small region of the skin 3 abuts directly against the foam layer 5.

In this example, polypropylene was used as material for the carrier. The skin 3 and the skin 4 are thermoformable films made of a thermoplastic elastomer. The foam layer 5 is foamed polyurethane.

The just described component was produced according to the method according to the invention in a foaming tool. The foaming tool comprises two tool halves. A strut is disposed in the second tool half.

When the foaming tool was opened, the carrier 2 was disposed in the first tool half so that the web 6 protruded into the cavity of the foaming tool.

The two skins 3 and 4 were disposed in the second tool half such that a skin abutted against the one side of the strut disposed in the second tool half in a planar manner and the other skin abutted against the other side of the strut in a planar manner. The end regions 8, 9 of the two skins 3 and 4 were guided together above the strut so that they overlapped in a planar manner. The skins were held in position by fixing at the outer edge and by suctioning by means of a vacuum.

Thereafter, the tool was closed and the rear-foaming process started. As a result of the rear-foaming, the overlapping region of the two skins was pressed against the web 6. As a result of the fact that the skin 4 is somewhat shorter than the skin 3, the foam penetrated partially into the intermediate regions skin 3-skin 4 and web-skin 3. The rear-foaming led to a frictional fitting connection of the overlapping region of the two skins 3 and 4 and the web 6.

After conclusion of the rear-foaming process, the component was removed.

The thus produced component has a decorative surface which comprises two skins 3 and 4. The cutting line of both skins is formed by a groove 7 which was produced by the impression of the strut of the foaming tool.

In this embodiment, groove and web are disposed offset. However, it is likewise possible to place the groove also directly above the web. The skins must then be disposed corresponding to the position of web and strut.

The invention claimed is:

1. An interior lining part for an automotive vehicle, comprising:
    a cover layer including at least two skins which form the cover layer, the at least two skins having angled-over end regions;
    a carrier; and
    a foam layer situated between the carrier and the at least two skins,
    wherein the at least two skins with the end regions are inserted into a second tool half of a tool in such a manner that the end regions are situated adjacently with the same orientation of angling, the tool further including a cavity-forming first tool half,
    wherein the at least two skins are one of rear-foaming and rear-spraying with one of a foam material and an injection moulding material,
    wherein the end regions are pressed together in one of a foam-tight manner and a spray-tight manner at least in regions by pressing at least on one side of the end regions which are situated one above the other against a wall which determines a form and a position of the pressed-together end regions,
    wherein the carrier has a web which protrudes into the foam layer and against which, on one side, the end regions which are situated one above the other abut mutually with the same orientation of angling of the at least two skins in a planar manner.

2. The interior lining part according to claim 1, wherein the web is perpendicular to a base of the carrier.

3. The interior lining part according to claim 1, wherein the part is a component which has a groove in an interface region of two adjacent skins of the at least two skins.

4. The interior lining part according to claim 1, wherein at least one of the at least two skins is made of a thermoplastic material.

5. The interior lining part according to claim 1, wherein the at least two skins comprise different materials.

\* \* \* \* \*